No. 861,911. PATENTED JULY 30, 1907.
W. & A. STEWART.
JOINT FOR ARTICLES OF FURNITURE OR WOODWORK.
APPLICATION FILED NOV. 4, 1905.

2 SHEETS—SHEET 1.

Witnesses:
E. A. Finckel.
Lillie M. Perry.

Inventors:
William Stewart.
Allan Stewart.
By W. H. Finckel Atty.

THE NORRIS PETERS CO., WASHINGTON, D. C.

No. 861,911. PATENTED JULY 30, 1907.
W. & A. STEWART.
JOINT FOR ARTICLES OF FURNITURE OR WOODWORK.
APPLICATION FILED NOV. 4, 1905.

2 SHEETS—SHEET 2.

Witnesses:
Lillie M. Perry.

Inventors:
William Stewart.
Allan Stewart.
Atty.

UNITED STATES PATENT OFFICE.

WILLIAM STEWART AND ALLAN STEWART, OF GLASGOW, SCOTLAND.

JOINT FOR ARTICLES OF FURNITURE OR WOODWORK.

No. 861,911.  Specification of Letters Patent.  Patented July 30, 1907.

Application filed November 4, 1905. Serial No. 285,943.

*To all whom it may concern:*

Be it known that we, WILLIAM STEWART and ALLAN STEWART, subjects of the King of Great Britain, residing at Glasgow, Scotland, have invented a certain new and useful Improvement in Joints for Articles of Furniture or Woodwork, of which the following is a full, clear, and exact description.

This invention relates to joints for articles of furniture and the like and has for its chief objects to simplify the construction of such joints, to facilitate the processes of uniting together and dismembering the various parts of such articles of furniture and the like to enable the same to be packed in the smallest possible compass for removal, shipment and storage, to reduce the cost of freight, and increase the general utility of such articles.

The invention consists of a joint for an article of furniture or woodwork, constructed of top and base boards, uprights and intermediate boards, comprising metal strips secured to some of said parts and flush with the broadsides thereof and adapted to engage saw-kerf grooves in the other parts, all as we will proceed now more particularly to set forth and finally claim.

The invention will be better understood by reference to the accompanying drawings, in which:—

Figure 1:
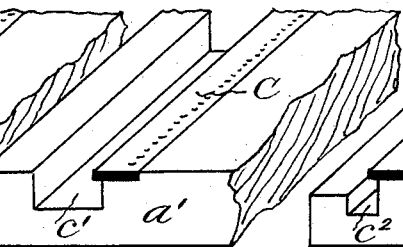
Figures 2, 3:
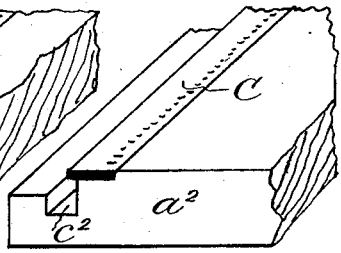
Figure 4:
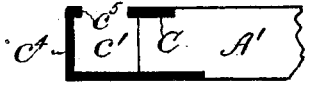
Figure 5:
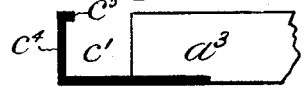
Figure 6:
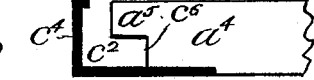

Figures 1, 2 and 3 are views in perspective representing metal-edged grooves in wood boards constituting the female portions of joints for articles of furniture, made in accordance with our invention. Figs. 4, 5 and 6 are views in sectional elevation representing the female portions of jointing grooves for articles of furniture composed of wood and metal parts and made in accordance with this invention. Figs. 7, 8, 9 and 10 are views in perspective representing the male portions of joints formed upon wood boards in accordance with our invention. Figs. 11, 12, 13, 14, 15 and 16 are views in sectional elevation, and Figs. 17, 18, 19, 20, 21 and 22, are views in perspective representing the combination of the aforesaid male and female parts of joints for furniture.

Similar letters of reference and numerals throughout the drawings indicate corresponding parts.

Figure 7:
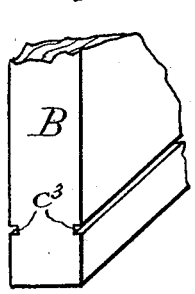
Figure 8:
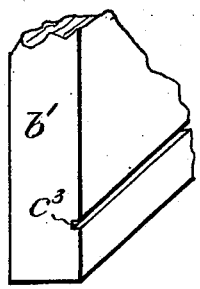
Figure 9:
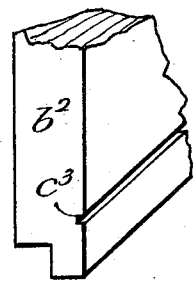

The metal strips C, Figs. 1, 2 and 3, which overhang the grooves or channels $c'$, $c^2$, are fitted into suitably recessed parts upon and made flush with the faces or broadsides of the boards A, $a'$, $a^2$. These strips are designed to engage with the small grooves or saw-kerfs $c^3$ which are formed in the boards B, $b'$, $b^2$, as represented in Figs. 7, 8 and 9. This union of the parts is illustrated in Figs. 11, 12, 13, 17, 18 and 19.

Figure 10:
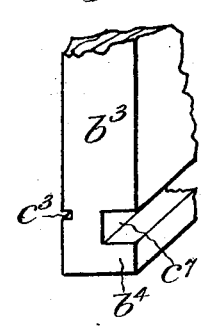
Figure 11:
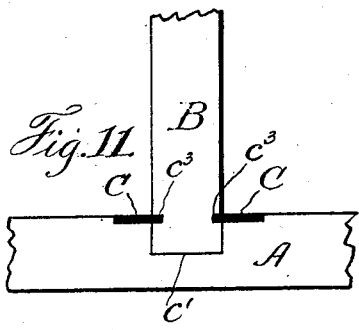
Figure 12:
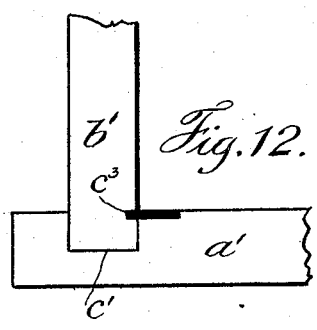
Figure 13:
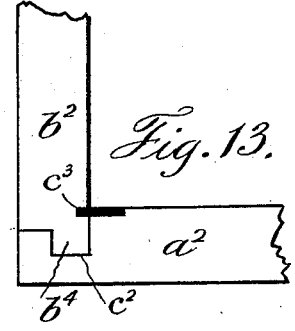
Figure 14:
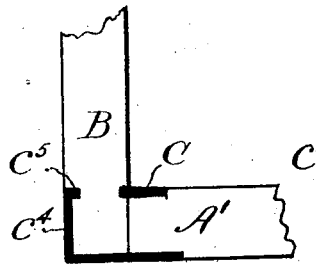
Figure 15:
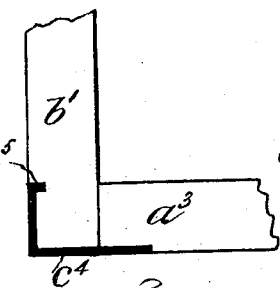

The angled metal parts $c^4$, with inwardly turned flanges $c^5$, which are fitted into suitably recessed parts upon the boards A' and $a^3$, Figs. 4 and 5, and made flush with both faces or broadsides of the boards, constitute modifications of the female portions of the joints represented in Figs. 1 and 2, and are designed for combination with parts of furniture and the like, such as the boards B, $b'$, containing narrow grooves or saw-kerfs $c^3$, Figs. 7 and 8, and the combination thereof is illustrated in Figs. 14, 15, 20 and 21. A similarly constructed female portion of a joint formed partly of metal is represented in Fig. 6 for combination with the male portion of the joint which is shown in Fig. 10.

Figure 16:
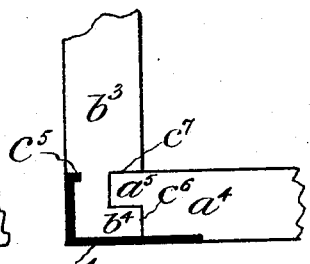
Figure 17:
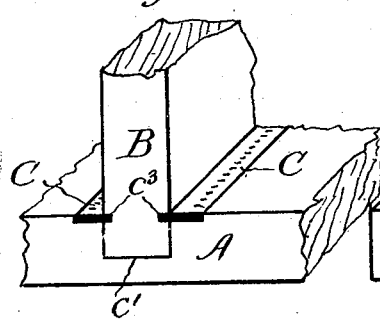
Figure 18:
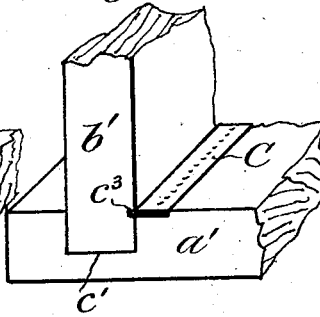
Figure 19:
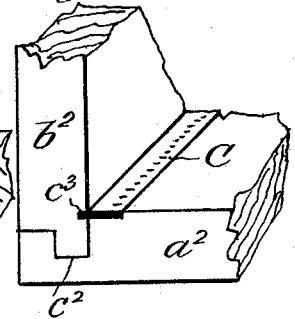
Figure 20:
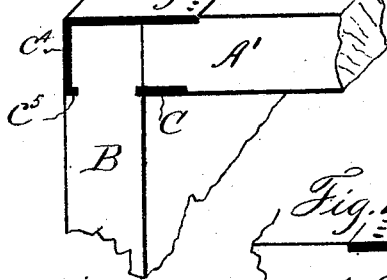
Figure 21:
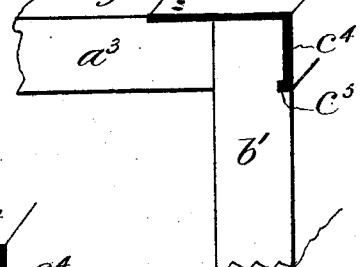
Figure 22:
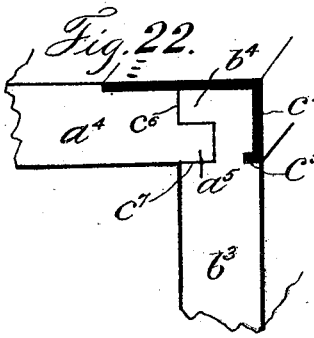

The rectangular female joint parts $c'$ and $c^2$ represented in Figs. 4, 5 and 6, have one wooden side and two metal sides. The wooden side is formed by the edge or thickness of the board A', $a^3$ or $a^4$, the latter being made with a tongue part $a^5$ and a rabbet $c^6$ for engaging with the groove $c^7$ and tongue $b^4$ upon the member $b^3$, Fig. 10. The combination of these last-named male and female joint parts is represented in Figs. 16 and 22. The male and female parts of these joints are fitted together by positioning the parts edge to edge and sliding the parts upon one another to the proper position. That is, the portions of furniture, such as the boards B, $b'$, $b^2$ and $b^3$, Figs. 7, 8, 9 and 10, can only be inserted within the grooves $c'$, $c^2$, at the end, and moved along the said grooves $c'$, $c^2$, into their several positions. As they are thus moved into the said grooves $c'$, $c^2$, the overhanging portions of the metal strips C and the flanges $c^5$ of the angled metal parts $c^4$, enter the narrow grooves or saw-kerfs $c^3$ in the aforesaid boards and prevent the latter being detached from them except by sliding the male portions out from the female portions.

Greater strength is obtained in these joints for furniture and other wooden structures by the overhanging edges of the female portions being formed of metal instead of wood and the corresponding cut-away grooves $c^3$ in the male portions being comparatively much smaller than in those dovetailed and other shaped joints which are made entirely of wood. The incisions or saw-kerfs $c^3$ are of the smallest possible dimensions consistent with their uses, and owing to their minute dimensions do not impair the strength of the male portions.

The metal strips C are thin but straight and unbreakable and the grooves $c^3$ for receiving them are merely shallow saw-kerfs. However slightly the metal strips C enter into the grooves $c^3$ they completely and effectively prevent these male and female parts being separated except by a sliding movement corresponding to that by which they are united together.

The aforesaid joints are designed more especially for use in dismemberable furniture, but if required they can be fixed and made permanent with glue or other adhesive.

These improved joints are characterized by the total absence of any strips, ledges or other obstructions projecting above the level or surface of the boards which contain them. The several parts which comprise the joints are either level with or beneath the surface of the boards of which they form parts.

The metal parts C, $c^4$, $c^5$, being flush with and fixed in any suitable manner to the broadsides of the boards with which they are combined, the parts A, a', and the like, can be packed in the smallest possible space, there being no shelf strips or such like projections to keep them apart or to injure polished surfaces in packing and transit.

These improved joints are designed for application to all kinds of "carcase" work in furniture or the like.

What we claim is:—

1. A joint for articles of furniture and woodwork constructed of top and base-boards, uprights and intermediate boards, comprising grooves or channels on some of said boards, metal strips secured in recesses upon said boards flush with the broadsides thereof and overhanging said grooves or channels, and matching ends on the others of said boards to fit said grooves or channels and provided with saw-kerfs cut in said matching ends and constituting grooves adapted to be engaged by the overhanging edges of said metal strips.

2. A joint for articles of furniture and woodwork, comprising grooved or channeled ends on the top and base-boards of said articles, and strips of rolled metal secured to said ends flush with the broadsides thereof and overhanging the grooves or channels, and matching ends on the uprights of said articles to fit said grooves or channels and provided with saw-kerfs cut in said matching ends beyond the edges thereof and constituting grooves adapted to be engaged by the overhanging edges of said metal strips.

3. Joints for articles of furniture and woodwork, comprising grooves or channels on the top and base-boards of said articles, flat strips of rolled metal secured in recesses upon said boards flush with the broadsides of said boards and overhanging said grooves or channels, and matching ends on the uprights of said articles to fit said grooves or channels and provided with saw-kerfs cut in said matching ends beyond the edges thereof and constituting grooves adapted to be engaged by the overhanging edges of said metal strips.

4. A joint for articles of furniture and woodwork, comprising matching abutting ends on the top and base-boards and upright boards of said articles, angled strips of rolled metal secured in recesses along the ends of said top and base-boards flush with the outer broadsides thereof and projecting over the ends of the upright boards and provided with inturned flanges at their free edges flush with the inner broadsides of said top and base-boards, and saw-kerf grooves in said upright boards adapted to be engaged by the inturned flanges of said angled metal strips.

Subscribed in the presence of two witnesses this twenty first day of October nineteen hundred and five.

WILLIAM STEWART.
ALLAN STEWART.

Witnesses:
    JOSEPH LOCKWOOD,
    JAMES GOLDIE.